United States Patent [19]
Snow et al.

[11] Patent Number: 5,999,130
[45] Date of Patent: Dec. 7, 1999

[54] DETERMINATION OF RADAR THREAT LOCATION FROM AN AIRBORNE VEHICLE

[75] Inventors: Adrian C. Snow, Christchurch, New Zealand; John F. Schipper, Palo Alto, Calif.

[73] Assignee: Trimble Navigation Limited, Sunnyvale, Calif.

[21] Appl. No.: 09/057,018

[22] Filed: Apr. 7, 1998

[51] Int. Cl.[6] ........................................ G01S 3/02
[52] U.S. Cl. ............................ 342/457; 701/300
[58] Field of Search .................... 342/455, 457; 701/225, 300, 301

[56] References Cited

U.S. PATENT DOCUMENTS

| | | | |
|---|---|---|---|
| 2,535,038 | 12/1950 | Busignies | 342/38 |
| 4,067,010 | 1/1978 | Hall | 343/6.81 LC |
| 4,910,526 | 3/1990 | Donnangelo et al. | 342/455 |
| 5,493,309 | 2/1996 | Bjornholt | 342/455 |
| 5,530,440 | 6/1996 | Danzer et al. | 340/933 |
| 5,786,773 | 7/1998 | Murphy | 340/947 |

OTHER PUBLICATIONS

Arthur Gelb et al., "Applied Optimal Estimation," pp. 102–103, MIT Press, Cambridge, 1992.
"Sky Guardian 2500 Compact ESM," GEC Marconi product brochure.

*Primary Examiner*—Thomas H. Tarcza
*Assistant Examiner*—Dao L. Phan
*Attorney, Agent, or Firm*—Wagner, Murabito & Hao LLP

[57] ABSTRACT

A method for estimating the location of the source of a (possibly unfriendly) electromagnetic probe signal (threat radar) received by an aircraft as the aircraft moves along a chosen path. A signal direction finder on the aircraft determines geometric parameters describing a probe signal plane that contains a probe signal propagation direction, as received at the aircraft, at two or more selected times. A location determination system on the aircraft determines the location of the aircraft at each of the selected times. Information on the probe signal plane and the aircraft location is used to estimate initial location coordinates and, optionally, velocity coordinates and acceleration coordinates, for the probe signal source, in two dimensions or in three dimensions. Probe signal planes at additional selected times can be used to provide a check on, or provide a more reliable estimate for, the probe signal source location. The probe signal source may be transported on a land-based, water-based or airborne vehicle.

24 Claims, 3 Drawing Sheets

DETERMINATION OF RADAR THREAT LOCATION FROM AN AIRBORNE VEHICLE

FIELD OF THE INVENTION

This invention relates to determination of location, velocity and other attributes of an active threat radar site, using measurements made from an airborne vehicle.

BACKGROUND OF THE INVENTION

When operating in a hostile environment, an airborne vehicle often uses a radar electronic surveillance system (RESS) to determine the presence of (possibly unfriendly) probe signals from a threat radar system (TRS), which may be ground-based, water-based or air-based. If such a probe signal is identified, the RESS, at best, is able to determine the relative bearing of the TRS from the present airborne vehicle location. This relative bearing information is sufficient to alert the airborne vehicle occupants to presence of a radar interrogation threat but does not, by itself, allow determination of the present location and/or velocity of the TRS. Lacking additional information, the airborne vehicle can only determine the general direction of the source of the TRS probe signals.

What is needed is an approach that allows an airborne vehicle with RESS to determine the present location of, distance to, and/or velocity of, a TRS facility that is transmitting probe signals. Preferably, this approach should allow determination of the location, distance and/or velocity in real time and relatively quickly and should allow flexibility in choice of the information used to determine the location, distance and/or velocity.

SUMMARY OF THE INVENTION

The invention meets these needs by providing a hybrid method, using location information from two or more sources, that allows real time determination of location of, distance to, and/or velocity of, an active TRS facility. The airborne vehicle is provided with (1) signal direction finding means to quickly determine the direction of propagation of probe signals received at the vehicle, (2) a satellite-based or other location determination (LD) system, such as GPS or GLONASS or LEO, and (3) an appropriately programmed computer that uses this direction and location information to quickly determine, by triangulation or other appropriate computations, location and/or velocity coordinates for the TRS facility, which may be moving. The approach requires determination of the probe signal direction and of the vehicle location at two or more probe signal receiver locations, which may be arbitrarily located relative to each other. A first plane and a second plane, representing the directions of the probe signals received at the first and second airborne vehicle locations, are determined. The intersection of the first and second planes defines a source line; and the TRS facility is estimated to lie along this source line. If the surface of the local terrain is modeled mathematically, for example, by a functional relation $F(x,y,z)=0$ involving two-dimensional or three-dimensional location coordinates, such as x, y and/or z, an intersection of the source line and this mathematical surface provides an estimate of the TRS facility location.

DESCRIPTION OF BEST MODES OF THE INVENTION

Figure 1:
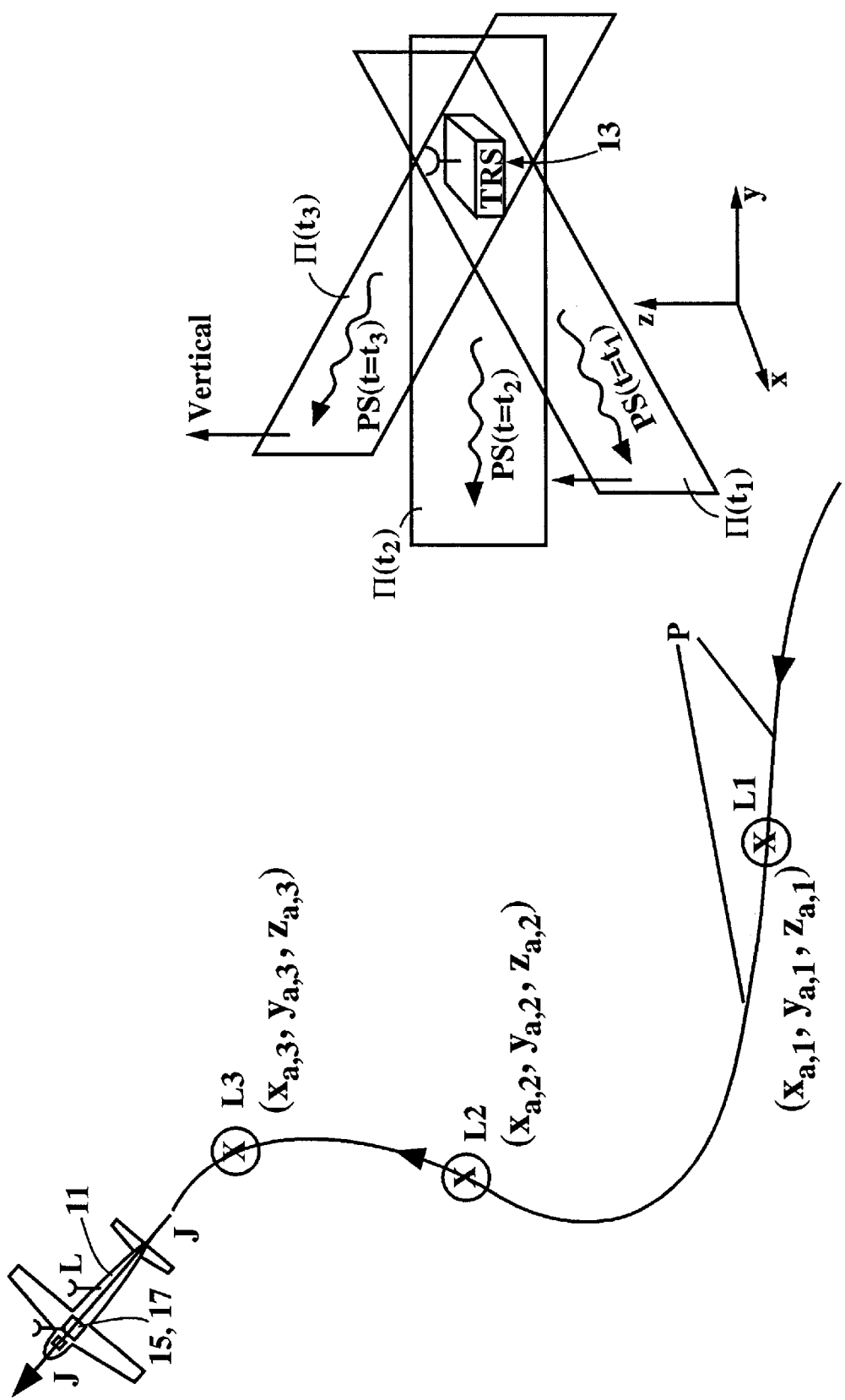
FIG. 1 illustrates practice of the invention in one embodiment.
Figure 2:
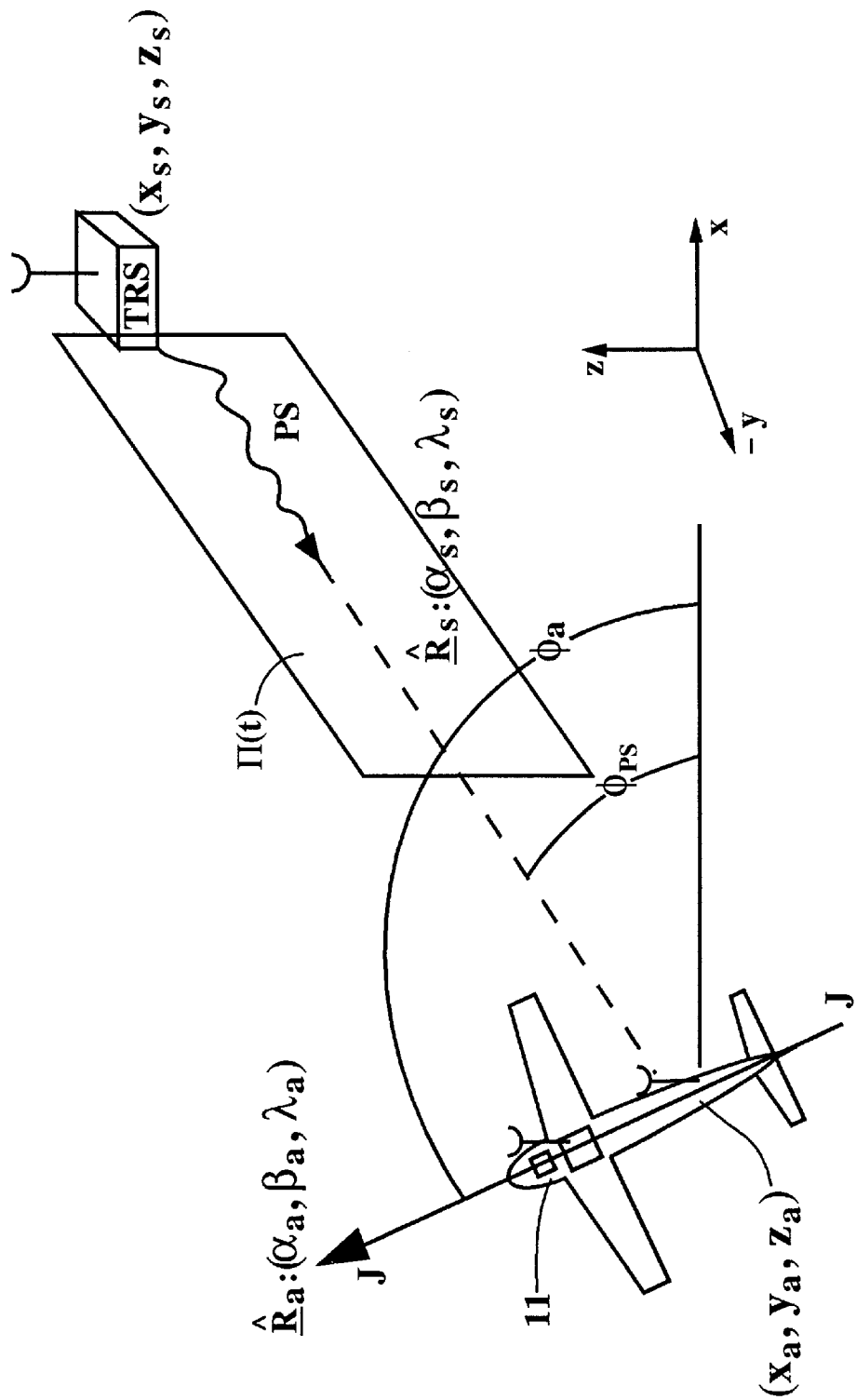
FIG. 2 illustrates angle conventions used in the invention.

In FIG. 1, an aircraft 11 moves along a selected path P, and as this vehicle moves it receives probe signals PS transmitted by a TRS facility located at an unknown present location 13. The TRS facility may be ground-based, water-based or air-based and may be stationary or may be moving. The aircraft 11 carries a probe signal direction finder 15 that can determine the direction of arrival of the probe signals relative to the present direction of flight or orientation of the aircraft. This direction of arrival of a probe signal PS is represented by an azimuthal probe angle $\phi_{PS}(t)$, relative to, say, a known line JJ that is oriented along the aircraft fuselage, as illustrated in FIGS. 1 and 2. The azimuthal probe angle $\phi_{PS}(t)$ defines an approximately vertically oriented probe signal plane $\Pi(t)$ for each of a sequence of times $t=t_1, t_2, t_3$, etc. at which the probe signal is sensed or the angle is measured, as illustrated in FIG. 1.

The aircraft 11 carries a location determination (LD) system 17, such as the Global Positioning System (GPS), the Global orbiting Navigational Satellite System (GLONASS) or modified Low Earth Orbit (LEO) System, that allows prompt determination of the present location and present orientation, represented by the location coordinates ($x_a, y_a, z_a$) and azimuthal vehicle angle $\phi_a$, respectively, of the aircraft. At each of two or more distinct locations $L_i$, corresponding to times $t=t_i$ ($i=1, 2, \ldots$), along the path P, the direction finder 15 determines an azimuthal probe angle $\phi_{PS,i}=\phi_{PS}(t=t_i)$, and the location determination system determines location coordinates ($x_{a,i}, y_{a,i}, z_{a,i}$) and an azimuthal aircraft angle $\phi_{a,i}=\phi_a)(t=t_i)$. Conventions for the measured azimuthal angles and location coordinates for a particular time are indicated in FIG. 2, and a similar illustration is extant for any time $t=t_j$. Any other consistent angle convention can be used here.

Assume initially that the aircraft is oriented in a horizontal plane at each of the times $t=t_i$ and $t=t_j$. If the two sets of measurements for $t=t_i$ and $t=t_j (j<i)$ are analyzed, a probe signal plane at time $t=t_i$ (containing the probe signal direction measured at the time $t=t_i$ and passing through the location with coordinates ($x_{a,i}, y_{a,i}, z_{a,i}$) is represented by the relationship $$(x-x_{a,i})\cos(\phi_{a,i}-\phi_{PS,i}) - (y-y_{a,i})\sin(\phi_{a,i}-\phi_{PS,i}) = 0. \quad (1)$$

Similarly, a probe signal plane at time $t=t_j$ is represented by the relationship $$(x-x_{a,j})\cos(\phi_{a,j}-\phi_{PS,j}) - (y-y_{a,j})\sin(\phi_{a,j}-\phi_{PS,j}) = 0. \quad (2)$$

These two (vertically oriented) planes intersect in a vertically oriented line (FIG. 1) whose coordinates ($x_{TRS}, y_{TRS}, z_{TRS}$) determined by the intersection of the two planes in Eqs. (1) and (2), are given by $$x_{TRS} = -s_{a,j} s_{a,i} r_i / det$$

$$y_{TRS} = -c_{a,j} c_{a,i} r_j / det \quad (3)$$

$$z_{TRS} = \text{undetermined}, \quad (4)$$

$$r_i = x_{a,i} c_{a,i} - y_{a,i} s_{a,i}, \quad (5)$$

$$r_j = x_{a,j} c_{a,j} - y_{a,j} s_{a,j}, \quad (6)$$

$$det = s_{a,i} c_{a,j} - c_{a,i} s_{a,j}. \quad (7)$$

$$c_{a,i} = \cos(\phi_{a,i} - \phi_{PS,i}), \quad (8)$$

$$s_{a,i} = \sin(\phi_{a,i} - \phi_{PS,i}), \tag{9}$$

$$c_{a,j} = \cos(\phi_{a,j} - \phi_{PS,j}), \tag{10}$$

$$s_{a,j} = \sin(\phi_{a,j} - \phi_{PS,j}), \tag{11}$$

The vertical location coordinate $z_{TRS}$ may be determined by intersection of the vertical line $(x=x_{TRS}(i,j), y=y_{TRS}(i,j), z=\text{arbitrary})$ with the terrain surface that is represented as $$F(x,y,z)=0, \tag{12}$$

if the terrain surface representation function F is known. In this instance, as few as two probe signal direction measurements suffice to estimate the location coordinates $(x_{TRS}, y_{TRS}, z_{TRS})$ of a non-moving TRS facility.

More generally, as illustrated in FIG. 2, the aircraft is not oriented in a horizontal plane at each of the times $t=t_i$ at which a direction of the received probe signal PS is measured, and/or the terrain surface representation function $F(x,y,z)$ is not known. In this more general situation, measurements of a probe signal plane at each of three distinct locations may suffice to determine the location coordinates of a non-moving TRS facility. Assume that the direction finder characterizes the probe signal by associating the received probe signal (at time $t=t_i$) with a (not-necessarily vertical) probe signal plane $\Pi(t_i)$, passing through the location Li with measured coordinates $(x_{a,i}, y_{a,i}, z_{a,i})$ and characterized by an equation $$(x-x_{a,i})\alpha_{s,i} + (y-y_{a,i})\beta_{s,i} + (z-z_{a,i})\chi_{s,i} = 0, \tag{13}$$

where $\alpha_{s,i}$, $\beta_{s,i}$ and $\chi_{s,i}$ are direction cosines of a (unit normal) vector oriented normal to the probe signal plane $\Pi(t_i)$ and $(x,y,z)$ are the unknown location coordinates of the TRS facility. If the probe signal plane is measured at three different times $t=t_1, t_2, t_3$, with different locations and at different aircraft angular orientations, three relations of the form of Eq. (13) are obtained, and these three relations can be re-expressed as a matrix equation, $$MX = B, \tag{14}$$

$$M = \begin{bmatrix} \alpha_{s,1} & \beta_{s,1} & \chi_{s,1} \\ \alpha_{s,2} & \beta_{s,2} & \chi_{s,2} \\ \alpha_{s,3} & \beta_{s,3} & \chi_{s,3} \end{bmatrix}, \tag{15}$$

$$X = \begin{bmatrix} x \\ y \\ z \end{bmatrix}, \tag{16}$$

$$B = \begin{bmatrix} x_{a,1}\alpha_{s,1} + y_{a,1}\beta_{s,1} + z_{a,1}\chi_{s,1} \\ x_{a,2}\alpha_{s,2} + y_{a,2}\beta_{s,2} + z_{a,2}\chi_{s,2} \\ x_{a,3}\alpha_{s,3} + y_{a,3}\beta_{s,3} + z_{a,3}\chi_{s,3} \end{bmatrix}, \tag{17}$$

The measured direction cosine components $\alpha_{s,i}$, $\beta_{s,i}$, $\chi_{s,i}$, in any row in Eqs. (15) and (17) can be multiplied by any non-zero constant, corresponding to multiplication by the same constant in Eq. (13).

The assumptions that the three probe signal measurement locations are distinct and that the three aircraft angular orientations are different may be sufficient to ensure that the determinant of the matrix M, det(M), is non-zero. Assuming that det(M) is non-zero, the inverse matrix $M^{-1}$ exists, and the estimated location coordinates for a stationary TRS facility are given by $$X = M^{-1}B. \tag{18}$$

Assume that the probe signals are received at location $L_i$, and the azimuthal angles $\phi_{PS,i}$ and $\phi_{a,i}$ and the location coordinates $(x_{a,i}, y_{a,i}, z_{a,i})$ are measured at this location, for N distinct locations $(i=1, 2, \ldots, N; N<3)$, as illustrated in FIG. 1. Each of the $$\binom{N}{3}$$

triples of probe signal planes thereby determined will provide an estimate of the TRS facility location, using Eqs. (14)–(18), assuming that the TRS transmitter does not move. The TRS facility locations estimated by these $$\binom{N}{3}$$

sets of location coordinates will likely be close to, but not coincident with, each other. Several methods are available to estimate a "true" location for the TRS facility, given these $$\binom{N}{3}$$

triples of probe signal planes and corresponding information. In a first approach, the three location coordinates are averaged to obtain an estimate of the "true" coordinates $$x(\text{true}) = \sum_{j=1}^{N} \sum_{k=j+1}^{N} \sum_{l=k+1}^{N} x_{TRS}(j, k, l) \Big/ \binom{N}{3}, \tag{19}$$

$$y(\text{true}) = \sum_{j=1}^{N} \sum_{k=j+1}^{N} \sum_{l=k+1}^{N} y_{TRS}(j, k, l) \Big/ \binom{N}{3}, \tag{20}$$

$$z(\text{true}) = \sum_{j=1}^{N} \sum_{k=j+1}^{N} \sum_{l=k+1}^{N} z_{TRS}(j, k, l) \Big/ \binom{N}{3}. \tag{21}$$

In a second approach, Eq. (14) results as before, but the matrix M is now an N×3 matrix with N rows (N≥4) of direction cosine components and B is an N×1 matrix. Using an approach that is discussed by A. Gelb et al in Applied Optimal Estimation, MIT Press, Cambridge, 1992, pp. 102–103, a least squares solution of Eq. (14) is first recast as determining a minimum least squares solution $X=X^\wedge$ for the quantity $$J = (B-MX)^{tr} R^{-1} (B-MX), \tag{22}$$

where R is an N×N symmetric, positive definite weighting matrix associated with the statistical variations of pairs of variables drawn from the vector B−MX. A least squares solution of Eq. (17) is $$X^\wedge = (M^{tr} R^{-1} M)^{-1} M^{tr} R^{-1} B, \tag{23}$$

where $M^{tr}$ is a 3×N matrix that is the transpose of the matrix M. In the simplest situation, one can set R equal to the identity matrix I in Eq. (23).

This second approach will not likely produce location coordinates for the TRS facility that coincide with the location coordinates produced in the first (averaging) approach. Any other reasonable approach can be used to estimate the location coordinates x(true), y(true) and z(true) for the TRS facility.

One probe signal direction finder suitable for use with this invention is the Sky Guardian 2500 Compact ESM, offered by GEC Marconi, which provides signal direction finding with angular uncertainty of no more than 10° rms, has a sensitivity against background noises of better than −65 dBm (CW) and better than −45 dBm (pulse), and can monitor signals with probe intervals as short as 50 nsec. The Sky Guardian is relatively compact and can be positioned almost anywhere on an aircraft, except where an incident probe signal might be shadowed by another portion of the aircraft, such as a wing or tailpiece.

This approach can be extended to estimate the velocity components, if any, of a TRS facility that is believed to be moving. Assume that the active TRS facility is moving with approximately constant velocity components $(v_x, v_y, v_z)$ as the site transmits, and assume that the aircraft 11 determines the direction cosine components for the probe signal plane $\Pi(t_i)$ at six distinct times $t=t_i$ for $i=1, 2, 3, 4, 5, 6$, with time increments $$\Delta t_{i,j} = t_i - t_j (i \neq j). \tag{24}$$

If the TRS facility is located at $(x0, y0, z0)$ at time $t=t0$ and is moving with approximately constant velocity components $(v_x, v_y, v_z)$ the TRS facility will have approximate location coordinates $$(x,y,z) = (x0 + v_x \Delta t_{0,j}, y0 + v_y \Delta t_{0,j}, z0 + v_z \Delta t_{0,j}) \tag{25}$$

at the time $t=t_j$ ($j=1, 2, 3, 4, 5, 6$), where $t0$ may, but need not, coincide with one of the times $t_j$.

By analogy with the development of Eqs. (14)–(18), the six variables $x0, y0, z0, v_x, v_y$ and $v_z$ that determine the TRS facility location are determined by the six relations $$(x0 - x_{a,1} + v_x \Delta t_{0,1}) \alpha_{s,1} + (y0 - y_{a,1} + v_y \Delta t_{0,1}) \beta_{s,1} + (z0 - z_{a,1} + v_z \Delta t_{0,1}) \chi_{s,1} = 0, \tag{26}$$

$$(x0 - x_{a,2} + v_x \Delta t_{0,2}) \alpha_{s,2} + (y0 - y_{a,2} + v_y \Delta t_{0,2}) \beta_{s,2} + (z0 - z_{a,2} + v_z \Delta t_{0,2}) \chi_{s,2} = 0, \tag{27}$$

$$(x0 - x_{a,3} + v_x \Delta t_{0,3}) \alpha_{s,3} + (y0 - y_{a,3} + v_y \Delta t_{0,3}) \beta_{s,3} + (z0 - z_{a,3} + v_z \Delta t_{0,3}) \chi_{s,3} = 0, \tag{28}$$

$$(x0 - x_{a,4} + v_x \Delta t_{0,4}) \alpha_{s,4} + (y0 - y_{a,4} + v_y \Delta t_{0,4}) \beta_{s,4} + (z0 - z_{a,4} + v_z \Delta t_{0,4}) \chi_{s,4} = 0, \tag{29}$$

$$(x0 - x_{a,5} + v_x \Delta t_{0,5}) \alpha_{s,5} + (y0 - y_{a,5} + v_y \Delta t_{0,5}) \beta_{s,5} + (z0 - z_{a,5} + v_z \Delta t_{0,5}) \chi_{s,5} = 0, \tag{30}$$

$$(x0 - x_{a,6} + v_x \Delta t_{0,6}) \alpha_{s,6} + (y0 - y_{a,6} + v_y \Delta t_{0,6}) \beta_{s,6} + (z0 - z_{a,6} + v_z \Delta t_{0,6}) \chi_{s,6} = 0, \tag{31}$$

Equations (26)–(31) can be re-expressed in matrix form as $$MX = B, \tag{32}$$

$$M = \begin{bmatrix} \alpha_{s,1} & \beta_{s,1} & \chi_{s,1} & \alpha_{s,1}\Delta t_{0,1} & \beta_{s,1}\Delta t_{0,1} & \chi_{s,1}\Delta t_{0,1} \\ \alpha_{s,2} & \beta_{s,2} & \chi_{s,2} & \alpha_{s,2}\Delta t_{0,2} & \beta_{s,2}\Delta t_{0,2} & \chi_{s,2}\Delta t_{0,2} \\ \alpha_{s,3} & \beta_{s,3} & \chi_{s,3} & \alpha_{s,3}\Delta t_{0,3} & \beta_{s,3}\Delta t_{0,3} & \chi_{s,3}\Delta t_{0,3} \\ \alpha_{s,4} & \beta_{s,4} & \chi_{s,4} & \alpha_{s,4}\Delta t_{0,4} & \beta_{s,4}\Delta t_{0,4} & \chi_{s,4}\Delta t_{0,4} \\ \alpha_{s,5} & \beta_{s,5} & \chi_{s,5} & \alpha_{s,5}\Delta t_{0,5} & \beta_{s,5}\Delta t_{0,5} & \chi_{s,5}\Delta t_{0,5} \\ \alpha_{s,6} & \beta_{s,6} & \chi_{s,6} & \alpha_{s,6}\Delta t_{0,6} & \beta_{s,6}\Delta t_{0,6} & \chi_{s,6}\Delta t_{0,6} \end{bmatrix}, \tag{33}$$

$$X = \begin{bmatrix} x0 \\ y0 \\ z0 \\ v_x \\ v_y \\ v_z \end{bmatrix}, \tag{34}$$

$$B = \begin{bmatrix} \alpha_{s,1}x_{a,1} + \beta_{s,1}y_{a,1} + \chi_{s,1}z_{a,1} \\ \alpha_{s,2}x_{a,2} + \beta_{s,2}y_{a,2} + \chi_{s,2}z_{a,2} \\ \alpha_{s,3}x_{a,3} + \beta_{s,3}y_{a,3} + \chi_{s,3}z_{a,3} \\ \alpha_{s,4}x_{a,4} + \beta_{s,4}y_{a,4} + \chi_{s,4}z_{a,4} \\ \alpha_{s,5}x_{a,5} + \beta_{s,5}y_{a,5} + \chi_{s,5}z_{a,5} \\ \alpha_{s,6}x_{a,6} + \beta_{s,6}y_{a,6} + \chi_{s,6}z_{a,6} \end{bmatrix}. \tag{35}$$

For distinct time increments $\Delta t_{0,j}$ ($j=1, 2, 3, 4, 5, 6$) and non-parallel probe signal plane angular orientations ($\alpha_{s,i}, \beta_{s,i}, \chi_{s,i}$), the determinant of the matrix M is non-zero so that the matrix M is invertible. The solution vector X of Eq. (32) becomes $$X = M^{-1}B. \tag{36}$$

This approach can be extended further to estimate the velocity and acceleration components, if any, of a TRS facility that is believed to be moving. Assume that the active TRS facility is moving with approximately constant acceleration components $(a_x, a_y, a_z)$ as the site transmits, and assume that the aircraft 11 determines the direction cosine components for the probe signal plane at six distinct times $t=t_i$ for $i=1, \ldots, 8, 9$, with time increments $$\Delta t_{i,j} = t_i - t_j (i \neq j). \tag{37}$$

If the TRS facility is located at $(x0, y0, z0)$ at time $t=t0$ and is moving with approximately constant acceleration components $(a_x, a_y, a_z)$, the TRS facility will have approximate location coordinates $$(x,y,z) = (x0 + v_x \Delta t_{0,j} + a_x \Delta t_{0,j}^2/2, y0 + v_y \Delta t_{0,j} + a_y \Delta t_{0,j}^2/2, z0 + v_z \Delta t_{0,j} + a_z \Delta t_{0,j}^2/2) \tag{38}$$

at the time $t=t_j$ ($i=1, \ldots, 8, 9$).

By analogy with the development of Eqs. (25)–(35), the nine variables $x0, y0, z0, v_x, v_y, v_z, a_x, a_y,$ and $a_z$ that determine the TRS facility location are determined by the matrix relations $$MX = B, \tag{39}$$

$$M = [M_{ij}](i, j = 1, \ldots, 9) \tag{40}$$

$$M_{1,j} = \alpha_{s,j} (j = 1, \ldots, 9), \tag{41}$$

$$M_{2,j} = \beta_{s,j} (j = 1, \ldots, 9), \tag{42}$$

$$M_{3,j} = \chi_{s,j} (j = 1, \ldots, 9), \tag{43}$$

$$M_{4,j} = \alpha_{s,j} \Delta t_{0,j} (j = 1, \ldots, 9), \tag{44}$$

$$M_{5,j} = \beta_{s,j} \Delta t_{0,j} (j = 1, \ldots, 9), \tag{45}$$

$$M_{6,j} = \chi_{s,j} \Delta t_{0,j} (j = 1, \ldots, 9), \tag{46}$$

$$M_{7,j} = \alpha_{s,j} (\Delta t_{0,j})^2 / 2 (j = 1, \ldots, 9), \tag{47}$$

$$M_{8,j} = \beta_{s,j} (\Delta t_{0,j})^2 / 2 (j = 1, \ldots, 9), \tag{48}$$

$$M_{9,j} = \chi_{s,j} (\Delta t_{0,j})^2 / 2 (j = 1, \ldots, 9), \tag{49}$$

$$\Delta t_{0,0} = 0. \tag{50}$$

-continued $$X = \begin{bmatrix} x0 \\ y0 \\ z0 \\ v_x \\ v_y \\ v_z \\ a_x \\ a_y \\ a_z \end{bmatrix}, \quad (51)$$

$$B = \begin{bmatrix} \alpha_{s,1}x_{a,1} + \beta_{s,1}y_{a,1} + \chi_{s,1}z_{a,1} \\ \alpha_{s,2}x_{a,2} + \beta_{s,2}y_{a,2} + \chi_{s,2}z_{a,2} \\ \alpha_{s,3}x_{a,3} + \beta_{s,3}y_{a,3} + \chi_{s,3}z_{a,3} \\ \alpha_{s,4}x_{a,4} + \beta_{s,4}y_{a,4} + \chi_{s,4}z_{a,4} \\ \alpha_{s,5}x_{a,5} + \beta_{s,5}y_{a,5} + \chi_{s,5}z_{a,5} \\ \alpha_{s,6}x_{a,6} + \beta_{s,6}y_{a,6} + \chi_{s,6}z_{a,6} \\ \alpha_{s,7}x_{a,7} + \beta_{s,7}y_{a,7} + \chi_{s,7}z_{a,7} \\ \alpha_{s,8}x_{a,8} + \beta_{s,8}y_{a,8} + \chi_{s,8}z_{a,8} \\ \alpha_{s,9}x_{a,9} + \beta_{s,9}y_{a,9} + \chi_{s,9}z_{a,9} \end{bmatrix}. \quad (52)$$

As before, the solution becomes $$x = m^{-1}b, \quad (53)$$

if the determinant of M is non-zero, and not too close to zero.

The model developed here allows the location coordinates (x,y,z) of a moving TRS facility to be estimated by the expressions $$x(t0+\Delta t) = x0 + v_x \Delta t + a_x (\Delta t)^2/2, \quad (54)$$

$$y(t0+\Delta t) = y0 + v_y \Delta t + a_y (\Delta t)^2/2, \quad (55)$$

$$z(t0+\Delta t) = z0 + v_z \Delta t + a_z (\Delta t)^2/2, \quad (56)$$

where the coefficients x0, y0, z0, $v_x$, $v_y$, $v_z$, $a_x$, $a_y$ and $a_z$ are determined from receipt and analysis of nine probe signals at different times and different antenna locations and aircraft angular orientations. The truncated Taylor series approximations in Eqs. (54)–(56) can be extended to higher degree terms, proportional to $(\Delta t)^n/n!$ (n=1, 2, 3, . . . ), if 3(n+1) probe signals are received and analyzed as discussed in the preceding. However, round-off error and small errors in determination of the aircraft location coordinates ($x_{a,i}, y_{a,i}, z_{a,i}$) and/or of the probe signal plane direction cosines ($\alpha_{s,i}, \beta_{s,i}, \chi_{s,i}$) may limit the accuracy one can achieve by extending Eqs. (54)–(56) to higher degree terms.

Figure 3:
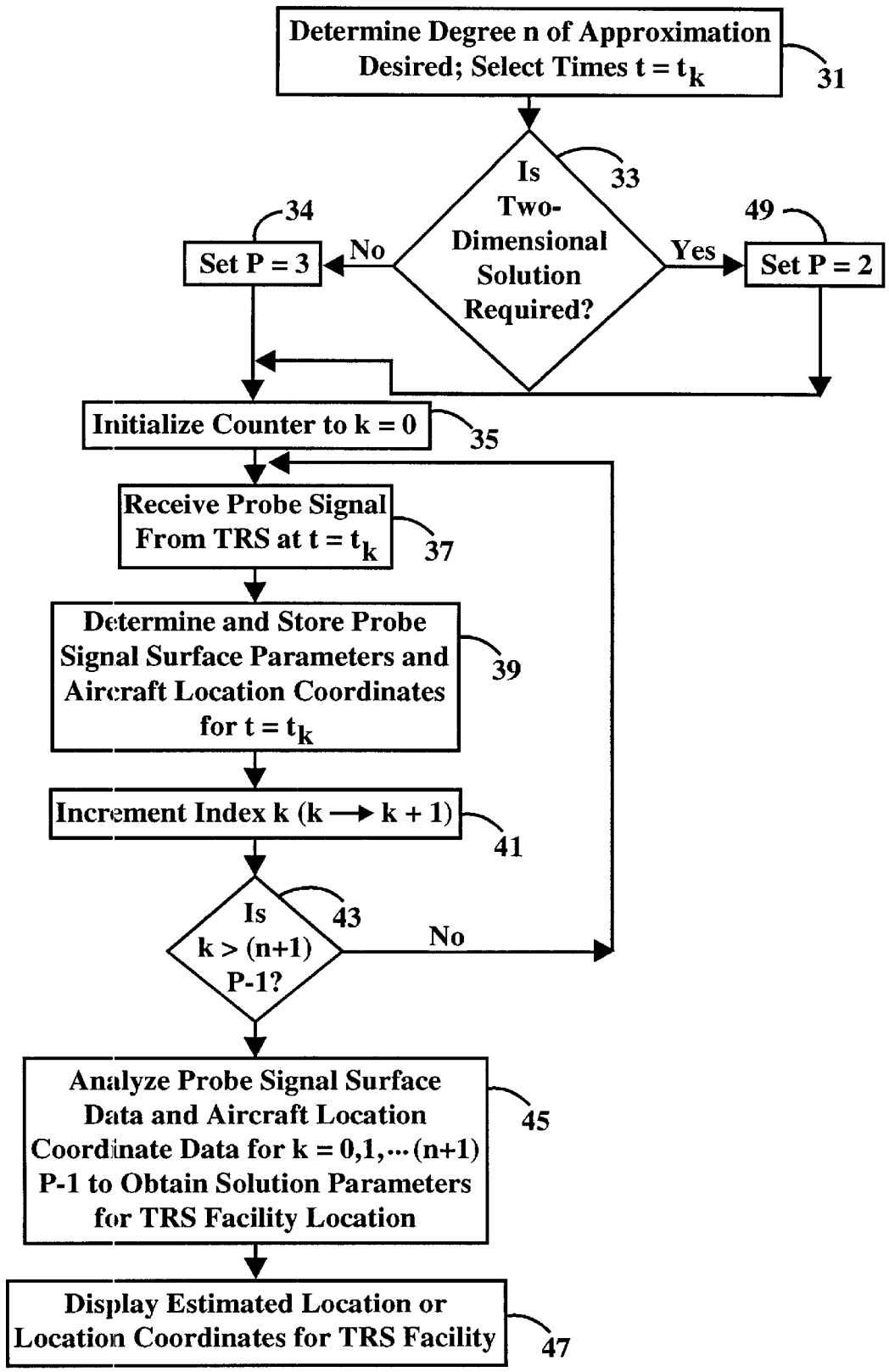
FIG. 3 is a flow chart for practicing the invention.

FIG. 3 is a flow chart illustrating a suitable procedure for practicing the invention. In step 31 (optional), the system determines what degree "n" of approximation is required and selects times $t=t_k$ for receipt and analysis of probe signals; the parameter "n" corresponds to the highest degree m or term $(\Delta t)^m$ that appears in the TRS facility coordinate estimates corresponding to Eqs. (54)–(56). As a default, the system can use n=0, 1 or 2, each of which has been developed in the preceding. In step 33 (optional), the system determines whether a two-dimensional solution is required.

If the answer to the question in step 33 is "no", so that three-dimensional location coordinates for the TRS facility must be determined, the system sets a geometry parameter P=3, in step 34, and initializes a counter index to k=0, in step 35. In step 37, the airborne system receives a probe signal from a TRS facility, at. an unknown location and at a selected time $t=t_k$ (k=0, 1, . . . ). At the time $t=t_k$, the system also determines and stores the probe signal plane parameters, such as the direction cosines ($\alpha_{s,k}, \beta_{s,k}, \chi_{s,k}$) for the plane normal, and determines and stores the location coordinates ($x_{a,k}, y_{a,k}, z_{a,k}$) of the aircraft antenna, in step 39. In step 41, the index k is incremented (k→k+1). In step 43, the system determines whether k<(n+1)P−1? If the answer to the question in step 43 is "no", the system recycles to step 37, with the index k now incremented, and repeats the steps 37, 39, 41 and 43. If the answer to the question in step 43 is "yes", the system analyzes, in step 45, the stored data according to Eqs. (14)–(18) (n=0), Eqs. (32)–(36) (n=1), Eqs. (39)–(53) (n=2), and corresponding equations for n≧3, if desired. This produces estimations for the solution parameters (x0,y0,z0) and/or ($v_x, v_y, v_z$) and/or ($a_x, a_y, a_z$) and/or . . . for the TRS facility location, if P=3.

In step 47 the system optionally displays, in graphical or alphanumeric format, the estimated location or location coordinates for the TRS facility. If more than (n+1)P probe signals are received and analyzed, the system uses the development associated with Eqs. (19)–(21), the development associated with Eq. (23), or some other suitable algorithm for estimating the "true"location coordinates of the TRS facility at a particular time.

If the answer to the question in step 33 is "yes", so that two-dimensional location coordinates for the TRS facility are to be estimated, the system sets the geometry parameter P=2, in step 49, and proceeds to step 35, as in the situation for P=3. In steps 37, 39, 43 and 45, the analysis for P=2 is different from, but parallel to, the analysis for P=3, as discussed in the preceding. Where P=2, estimations for the solution parameters (x0,y0) and/or ($v_x, v_y$) and/or ($a_x, a_y$) and/or . . . for the TRS facility location result from processing of the (n+1)P probe signals and aircraft location coordinates. The system analyzes, in step 45, the stored data according to the two-dimensional analogues of Eqs. (14)–(18) (n=0), Eqs. (32)–(36) (n=1), Eqs. (39)–(53) (n=2), and corresponding equations for n≧3, if desired. In step 47 the system optionally displays, in graphical or alphanumeric format, the estimated location or location coordinates for the TRS facility in a two-dimensional format.

If more than (n+1)P probe signals are received and analyzed (with P=2 or P=3), the system uses the development associated with Eqs. (19)–(21), the development associated with Eq. (23), or some other suitable algorithm for time. The probe signal surface (plane) parameters may be direction cosines or may be some other geometric set that defines each plane containing one of the probe signals.

The present elevation of the TRS facility may be determined using other approaches as well. If the RESS provides output signals representing an elevation angle from the aircraft 11 to the TRS facility, comparison of this elevation angle from two or more aircraft locations will allow estimation of the TRS facility elevation, if the TRS facility is not moving. If the RESS does not provide output signals representing an elevation angle from the aircraft 11 to the TRS facility, the RESS output signals may be transformed to a selected reference plane, using an altitude sensor such as the Trimble TANS vector receiver. The elevation angle at a particular aircraft location is then determined by transforming the received probe signal information from the selected reference plane to a locally horizontal plane. If the TRS facility is believed to be moving, the preceding development associated with Eqs. (25)–(35) or with Eqs. (38)–(56) is preferably used to estimate the present location of the TRS facility.

The preceding analysis is not limited to estimation of the present location of a stationary TRS facility or of a TRS facility transported on a land vehicle. The TRS facility may be stationary or may be positioned on a land, waterborne or airborne vehicle that is moving. If the vehicle on which the TRS facility is being transported is an airborne vehicle, the third component of velocity, $v_z$, and/or the third component of acceleration, $a_z$, may have a large magnitude. If this large magnitude parameter appears, this may indicate that the TRS facility is not being transported on a land-based or water-based vehicle. If all velocity and acceleration components are smaller than selected threshold values, the system may conclude that, at the times of measurement, the TRS facility is or was not moving.

We claim:

1. A method for estimating the location of a source of probe signals of electromagnetic radiation received by an aircraft, the method comprising the steps of:

receiving a probe signal at an aircraft at K distinct selected times (K≧2), determining one or more selected parameters that describe a probe signal surface that contains the probe signal propagation direction as the probe signal arrives at the aircraft, and determining the location coordinates of the aircraft, at each selected time;

using the probe signal surface parameters and the aircraft location coordinates for the selected times to estimate the location of a source for the probe signal for at least one selected source location time;

choosing said probe signal surface to be probe signal plane containing said probe signal propagation direction;

choosing at least three of said selected parameters the describe the probe signal plane to be proportional to direction cosines of a line extending perpendicularly to the plane; and choosing said selected number K to be at least 2; representing a first probe signal plane by a collection of two-dimensional Cartesian coordinates (x, y) that satisfy a first relation $(x-x_a,i)\cos(\phi_a,i-\phi PS,i)-(y-y_a,i)\sin(\phi_a,i-\phi PS,i)=0(i=1);$ representing a second probe signal plane by a collection of two-dimensional Cartesian coordinates (x,y) that satisfy a second relation $(x-x_a,i)\cos(\phi_a,i-\phi PS,i)-(y-y_a,i)\sin(\phi_a,i-\phi PS,i)=0(i=2);$ where $(x_a i, Y_a, i)$ are the location coordinates of said aircraft at a time said probe signal plane parameters are determined $(\cos\phi_a, i, \sin\phi_a, I)$ is a vector representing an orientation direction for said aircraft at a time said probe signal plane parameters are determined, and $(\cos\phi_{PS,i}, \sin\phi_{PS,i})$ is a vector representing said probe signal plane, for i=1,2;

obtaining a simultaneous solution (x',y') for the location coordinates (x,y) that simultaneously satisfy the first and the second relations; and interpreting the simultaneous solution (x',y') as two-dimensional location coordinates for said probe signal source.

2. The method of claim 1, further comprising the step of choosing said selected source location time to coincide with at least one of said selected probe signal receipt times.

3. The method of claim 1, further comprising the step of estimating location coordinates for said probe signal source at said selected source location time that lies in a time interval between the earliest and the latest of said selected probe signal receipt times.

4. The method of claim 1, further comprising the step of determining said source location in two dimensions.

5. The method of claim 4, further comprising the steps of:

choosing said selected number K to be at least equal to 4; and estimating location coordinates and velocity coordinates for said probe signal source at said selected source location time that lies in a time interval between the earliest and the latest of said selected probe signal receipt times.

6. The method of claim 4, further comprising the steps of:

choosing said selected number K to be at least equal to 6; and estimating location coordinates, velocity coordinates and acceleration coordinates for said probe signal source at said selected source location time that lies in a time interval between the earliest and the latest of said selected probe signal receipt times.

7. The method of claim 1, further comprising the steps of:

choosing said number K to be at least equal to 3; and determining said source location in three dimensions.

8. The method of claim 7, further comprising the steps of:

choosing said selected number K to be at least equal to 6; and estimating location coordinates and velocity coordinates for said probe signal source at said selected source location time that lies in a time interval between the earliest and the latest of said selected probe signal receipt times.

9. The method of claim 7, further comprising the steps of:

choosing said selected number K to be at least equal to 9; and estimating location coordinates, velocity coordinates and acceleration coordinates for said probe signal source at said selected source location time that lies in a time interval between the earliest and the latest of said selected probe signal receipt times.

10. The method of claim 1, further comprising three steps of:

choosing said selected number K to be at least 3;

representing a first probe signal plane by a collection of three-dimensional Cartesian coordinates (x, y, z) that satisfy a first relation $(x-x_a i)\alpha_a i+(y-y_a,i)\beta a,i+(z-z_a,i)\chi_a,i=0(i=1);$ representing a second probe signal plane by a collection of three-dimensional Cartesian coordinates (x,y,z) that satisfy a second relation $(x-x_a,i)\alpha_a,i+(y-y_a i)\beta_a,i+(z-z_a,i)\chi_a,i=0(i=2);$ representing a third probe signal plane by a collection of three-dimensional Cartesian coordinates (x,y,z) that satisfy a third relation $(x-x_a,i)\alpha_a,i+(y-y_a,i)\beta_a,i+(z-z_a i)=0(i=3)$ where $(x_a, i, y_a, i, z_a, i)$ are the location coordinates of said aircraft at a time said probe signal planes parameters are determined, $\alpha_a, i, \beta_a i$ and $\chi_a, i$ are direction cosines representing said probe signal plane, for I=1, 2, 3;

obtaining a simulataneour solution (x', y', z') for the location coordinates (x, y, z) that simultaneously satisfy the first, second and third relations; and interpreting the simultaneous solution (x', y', z') as three-dimensional location coordinates for said probe signal source.

11. The method of claim 1, further comprising three steps of:

choosing said selected number K to be at least 6;

representing the location coordinates (x(t), y(t),z(t)) of said probe signal source as a function of time t by the relations $$x(t)=x_0+v_x(t-t_0),$$

$$y(t)=y_0+v_y(t-t_0),$$

$$z(t)=z_0+v_z(t-t_0),$$

where $(x_0, y_0, z_0)$ are location coordinates for said probe signal source at a selected time $t=t_0$, $(v_x, v_y, v_z)$ are velocity coordinates for said probe signal at a selected time $t=t_0$, and at least one of the coordinates $x_0$, $y_0$, $z_0$, $v_x$, $v_y$, $v_z$ is unknown;

representing a first probe signal plane by a collection of three-dimensional Cartesian coordinates (x, y, z) that satisfy a first relation $$(x_0-x_a,i+v_x\Delta t_i,0)\alpha_a,i+(y_0-y_a,+v_y\Delta t_i,0)\beta_a,i+(z_0-z_a, i+v_z\Delta t_i,0)\chi_a,i=0(i=1);$$

representing a second probe signal plane by a collection of three-dimensional Cartesian coordinates (x,y,z) that satisfy a second relation $$(x_0-x_a,i+v_x\Delta t_i,0)\alpha_a,i+(y_0-y_a,i+v_y\Delta t_i,0)\beta a,i+(z_0-z_a, i+v_z\Delta t_i,0)\chi_a,i=0(i=2);$$

representing a third probe signal plane by a collection of three-dimensional Cartesian coordinates (x, y, z) that satisfy a third relation $$(x_0-x_a,i+v_x\Delta t_i,0)\alpha_a,i+(y_0-y_a,i+v_y\Delta t_i,0)\beta a,i+(z_0-z_a, i+v_z\Delta t_i,0)\chi_a,i=0(i=3);$$

representing a fourth probe signal plane by a collection of three-dimensional Cartesian coordinates (x, y, z) that satisfy a fourth relation $$(x_0-x_a,i+v_x\Delta t_i,0)\alpha_a,i+(y_0-y_a,i+v_y\Delta t_i,i+(z_0-z_a, i+v_z\Delta t_i,0)\chi_a,i=0(i=4);$$

representing a fifth probe signal plane by a collection of three-dimensional Cartesian coordinates (x, y, z) that satisfy a fifth relation $$(x_0-x_a,i+v_x\Delta t_i,0)\alpha_a,i+(y_0-y_a,+v_y\Delta t_i,0)\beta a,i+(z_0-z_a, i+v_z\Delta t_i,0)\chi_a,i=0(i=5);$$

representing a sixth probe signal plane by a collection of three-dimensional Cartesian coordinates (x, y, z) that satisfy a sixth relation $$(x_0-x_a, i+v_x\Delta t_i,0)\alpha_a, i+(y_0-y_a, i+v_y\Delta t_i,0)\beta a,i+(z_0-z_a, i+v_z\Delta t_i,0)\chi_a,i=0(i=6),$$

where $(x_a,i,y_a,i,z_a, i)$ are the location coordinates of said aircraft at a time said probe signal plane parameters are determined, $\chi_a$, i, $\beta a$,i and $\chi_a$,i are direction cosines representing said probe signal plane, for i=1, 2, 3, 4, 5, 6, and $\Delta t_i,0=t_i-t_0$;

obtaining a simultaneous solution $(x'_0, y'_0, z'_0, v'_x, v'_y, v'_z)$ for the location coordinates and velocity coordinates that simulataneously satisfy the first, second, third, fourth, fifth, and sixth relations; and interpreting the location coordinates $$x(t)=x'_0+v'_x(t-t_0),$$

$$y(t)=y'_0+v'_y(t-t_0),$$

$$z(t)=z'_0+v'_z(t-t_0),$$

as three-dimensional location coordinates for said probe signal source for at least one time t.

12. The method of claim 1, further comprising three steps of:

choosing said selected number K to be at least 9;

representing the location coordinates (x(t), y(t), z(t)) of said probe signal source as a function of time t by the relations $$x(t)=x_0+v_x(t-t_0)+a_x(t-t0)2/2,$$

$$y(t)=y_0+v_y(t-t_0)+a_y(t-t0)2/2,$$

$$z(t)=z_0+v_z(t-t_0)+a_z(t-t0)2/2,$$

where $(x_0, y_0, z_0)$ are location coordinates for said probe signal source at a selected time $t=t_0$, $(v_x, v_y, v_z)$ are velocity coordinates for said probe signal at the time $t=t_0$, $(a_x, a_y, a_z)$ are acceleration coordinates for said probe signal at the time $t=t_0$, and at least one of the coordinates $x_0$, $y_0$, $z_0$, $v_x$, $v_y$, $a_x$, $a_y$, $a_z$ is unknown;

representing a first probe signal plane by a collection of three-dimensional Cartesian coordinates (x, y, z) that satisfy a first relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0\ (i=1);$$

representing a second probe signal plane by a collection of three-dimensional Cartesian coordinates (x, y, z) that satisfy a second relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0\ (i=2);$$

representing a third probe signal plane by a collection of three-dimensional Cartesian coordinates (x, y, z) that satisfy a third relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0\ (i=3);$$

representing a fourth probe signal plane by a collection of three-dimensional Cartesian coordinates (x, y, z) that satisfy a fourth relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0\ (i=4);$$

representing a fifth probe signal plane by a collection of three-dimensional Cartesian coordinates (x, y, z) that satisfy a fifth relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0\ (i=5);$$

representing a sixth probe signal plane by a collection of three-dimensional Cartesian coordinates (x, y, z) that satisfy a sixth relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0 \ (i=6);$$

representing a seventh probe signal plane by a collection of three-dimensional Cartesian coordinates (x, y, z) that satisfy a seventh relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0 \ (i=7);$$

representing an eighth probe signal plane by a collection of three-dimensional Cartesian coordinates (x, y, z) that satisfy an eighth relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0 \ (i=8);$$

representing a ninth probe signal plane by a collection of three-dimensional Cartesian coordinates (x, y, z) that satisfy a ninth relation $$(x_0-x_a, i+v_x\Delta t_i, 0+a_x(\Delta t_i,0)2/2)\alpha_a, i+(y_0-y_a, i+v_y\Delta t_i, 0+a_y(\Delta t_i,0)2/2)\beta a,i+$$

$$(z_0-z_a, i+v_z\Delta t_i, 0+a_z(\Delta t_i,0)2/2)\chi_a, i=0 \ (i=9);$$

where ($x_a$, i, $y_a$,i, $z_a$, i) are the location coordinates of said aircraft at a time said probe signal plane parameters are determined, $\alpha_a$,i, $\beta a,i$ and $\chi_a$,i are direction cosines representing said probe signal plane, for i=1, 2, 3, 4, 5, 6, 7, 8, 9, and $\Delta t_i$, $0=t_i-t_0$;

obtaining a simultaneous solution (x'$_0$, y'$_0$, z'$_0$, v'$_y$, v'$_y$, v'$_i$, a'$_x$, a'$_y$, a'$_z$) for the location coordinates, velocity coordinates and acceleration coordinates that simultaneously satisfy the first, second, third, fourth, fifth, sixth, seventh, eighth, and ninth relations; and interpreting the location coordinates $$x'(t)=x'_0+v'_x(t-t_0)+a'_x(t-t0)2/2,$$

$$y'(t)=y'_0+v'_y(t-t_0)+a'_y(t-t0)2/2,$$

$$z'(t)=z'_0+v'_z(t-t_0)+a'_x(t-t0)2/2,$$

as three-dimensional location coordinates for said probe signal source for at least one time t.

13. Apparatus for estimating the location of a source of probe signals of electromagnetic radiation received by an aircraft, the apparatus comprising:

a probe signal receiver, carried on an aircraft, that receives a probe signal at the aircraft at K distinct selected times (K≦2), that determines and issues one or more geometric parameters that describes a probe signal surface that contains the probe signal propagation direction as the probe signal arrives at the aircraft, and that determines and issues the location coordinates of the aircraft, at each selected time; and a computer that is programmed to receive and use the probe signal geometric parameters and the aircraft location coordinates for the selected times to estimate the location of a source for the probe signal for at least one selected source location time, said probe signal surface chosen to be a probe signal plane containing said probe signal propagation direction and at least three of said selected parameters the describe the probe signal plane are chosen to be proportional to direction cosines of a line extending perpendicularly to the plane, said number K is at least 2 and said computer:

represents a first probe signal plane by a collection of two-dimensional Cartesian coordinates (x, v) that satisfy a first relation $$(x-x_a,i)\cos(\phi_a,i-\phi PS,i)-(y-y_a, i)\sin(\phi_a, i-\phi PS,i)=0 \ (i=1);$$

represents a second probe signal plane by a collection of two-dimensional Cartesian coordinates (x, y) that satisfy a second relation $$(x-x_a,i)\cos(\phi_a,i-\phi PS,i)-(y-y_a, i)\sin(\phi_a, i-\phi PS,i)=0 \ (i=2);$$

where ($x_a$, i,$y_a$, i) are the location coordinates of said aircraft at a time said probe signal plane parameters are determined, ($\cos\phi_a$, i, $\sin\phi_a$, i) is a vector representing an orientation direction for said aircraft at a time said probe signal plane parameters are determined, and ($\cos \phi$ PS,i, $\sin \phi$ PS,i,) is a vector representing said probe signal plane, for i=1, 2;

obtains a simultaneous solution (x', y') for the location coordinates (x, y) that simultaneously satisfy the first and the second relations; and interprets the simultaneous solution (x', y') as two-dimensional location coordinates for said probe signal source.

14. The apparatus of claim 13, wherein said selected source location time is chosen to coincide with at least one of said selected probe signal receipt times.

15. The apparatus of claim 13, wherein said computer estimates location coordinates for said probe signal source at said selected source location time that lies in a time interval between the earliest and the latest of said selected probe signal receipt times.

16. The apparatus of claim 13, wherein said computer determines said source location in two dimensions.

17. The apparatus of claim 16, wherein said number K is at least 4 and said computer:

estimates location coordinates and velocity coordinates for said probe signal source at said selected source location time that lies in a time interval between the earliest and the latest of said selected probe signal receipt times.

18. The apparatus of claim 16, wherein said selected number K is at least 6 and said computer:

estimates location coordinates, velocity coordinates and acceleration coordinates for said probe signal source at said selected source location time that lies in a time interval between the earliest and the latest of said selected probe signal receipt times.

19. The apparatus of claim 13, wherein said number K is at least 3 and said computer:

determines said source location in three dimensions.

20. The apparatus of claim 13, wherein said number K is at least 6 and said computer:

estimates location coordinates and velocity coordinates for said probe signal source at said selected source location time that lies in a time interval between the earliest and the latest of said selected probe signal receipt times.

21. The apparatus of claim 19, wherein said number K is at least 9 and said computer:

estimates location coordinates, velocity coordinates and acceleration coordinates for said probe signal source at said selected source location time that lies in a time interval between the earliest and the latest of said selected probe signal receipt times.

22. The apparatus of claim 13, wherein said number K is at least 3 and said computer:

represents a first probe signal plane by a collection of three-dimensional Cartesian coordinates (x, y, z) that satisfy a first relation $(x-x_a, i)\alpha_a, i+(y-y_a, i)\beta a, i+(z-z_a, i)\chi_a, i=0$ ($i=1$);

represents a second probe signal plane by a collection of three-dimensional Cartesian coordinates (x, y, z) that satisfy a second relation $(x-x_a, i)\alpha_a, i+(y-y_a, i)\beta a, i+(z-z_a, i)\chi_a, i=0$ ($i=2$);

represents a third probe signal plane by a collection of three-dimensional Cartesian coordinates (x, y, z) that satisfy a third relation $(x-x_a, i)\alpha_a, i+(y-y_a, i)\beta a, i+(z-z_a, i)\chi_a, i=0$ ($i=3$);

where $(x_a a,i,y_a,i,z_a,i)$ are the location coordinates of said aircraft at a time said probe signal plane parameters are determined, $\alpha_a,i$, $\beta_a,i$ and $\chi a,i$ are direction cosines representing said probe signal surface, for i=1, 2, 3;

obtains a simulataneous solution (x', y', z') for the location coordinates (x, y, z) that simultaneously satisfy the first, second, and third relations; and interprets the simultaneous solution (x', y', z') as three-dimensional location coordinates for said probe signal source.

23. The apparatus of claim 13, wherein said number K is at least 6 and said computer:

represents the location coordinates (x (t), y (t), z (t)) of said probe signal source as a function of time t by the relations $x(t)=x_0+v_x(t-t_0)$, $y(t)=y_0+v_y(t-t_0)$, $z(t)=z_0+v_z(t-t_0)$, where $(x_0, y_0, z_0)$ are location coordinates for said probe signal source at a selected time $t=t_0$, $(v_x, v_y, v_z)$ are velocity coordinates for said probe signal at a selected time $t=t_0$, and at least one of the coordinates $x_0$, $y_0$, $z_0$, $v_x$, $v_y$, $v_z$ is unknown;

represents a first probe signal plane by a collection of three-dimensional Cartesian coordinates (x, y, z) that satisfy a first relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=1$);

represents a second probe signal plane by a collection of three-dimensional Cartesian coordinates (x, y, z) that satisfy a second relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=2$);

represents a third probe signal plane by a collection of three-dimensional Cartesian coordinates (x, y, z) that satisfy a third relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=3$);

represents a fourth probe signal plane by a collection of three-dimensional Cartesian coordinates (x, y, z) that satisfy a fourth relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=4$);

represents a fifth probe signal plane by a collection of three-dimensional Cartesian coordinates (x, y, z) that satisfy a fifth relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=5$);

represents a sixth probe signal plane by a collection of three-dimensional Cartesian coordinates (x, y, z) that satisfy a sixth relation $(x_0-x_a, i+v_x\Delta t_i 0)\alpha_a, i+(y_0-y_a, i+v_y\Delta t_i,0)\beta a,i+(z_0-z_a,i+v_z\Delta t_i,0)\chi_a,i=0$ ($i=6$);

where $(x_a,i,y_a i, z_a,i)$ are the location coordinates of said aircraft at a time said probe signal plane parameters are determined, $\alpha_a$, i, $\beta a,i$ and $\chi_a,i$ are direction cosines representing said probe signal plane, for i=1, 2, 3, 4, 5, 6, and $\Delta t_i$, $0=t_i-t_0$;

obtains a simultaneous solution $(x'_0, y'_0, z'_0, v'_y, v'_y, v'_z)$ for the location coordinates and velocity coordinates that simultaneously satisfy the first, second, third, fourth, fifth, and sixth relations; and interprets the location coordinates $x(t)=x'_0+v'_x(t-t_0)$, $y(t)=y'_0+v'_y(t-t_0)$, $z(t)=z'_0+v'_z(t-t_0)$, as three-dimensional location coordinates for said probe signal source for at least one time t.

24. The apparatus of claim 13, wherein said number K is at least 9 and said computer:

represents the location coordinates (x(t), y(t), z(t)) of said probe signal source as a function of time t by the relations $x(t)=x_0+v_x(t-t_0)+a_x(t-t0)2/2$, $y(t)=y_0+v_y(t-t_0)+a_y(t-t0)2/2$, $z(t)=z_0+v_z(t-t_0)+a_z(t-t0)2/2$, where $(x_0, y_0, z_0)$ are location coordinates for said probe signal source at a selected time $t=t_0$, $(v_x, v_y, v_z)$ are velocity coordinates for said probe signal at a selected time $t=t_0$, and at least one of the coordinates $x_0$, $y_0$, $z_0$, $v_x$, $v_y$, $v_z$, $a_x$, $a_y$, $a_z$ is unknown;

represents a first probe signal plane by a collection of three-dimensional Cartesian coordinates (x, y, z) that satisfy a first relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0$ ($i=1$);

represents a second probe signal plane by a collection of three-dimensional Cartesian coordinates (x, y, z) that satisfy a second relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=2);$ represents a third probe signal plane by a collection of three-dimensional Cartesian coordinates (x, y, z) that satisfy a third relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=3);$ represents a fourth probe signal plane by a collection of three-dimensional Cartesian coordinates (x, y, z) that satisfy a fourth relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=4);$ represents a fifth probe signal plane by a collection of three-dimensional Cartesian coordinates (x, y, z) that satisfy a fifth relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=5);$ represents a sixth probe signal plane by a collection of three-dimensional Cartesian coordinates (x, y, z) that satisfy a sixth relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=6);$ represents a seventh probe signal plane by a collection of three-dimensional Cartesian coordinates (x, y, z) that satisfy a seventh relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=7);$ represents a eighth probe signal plane by a collection of three-dimensional Cartesian coordinates (x, y, z) that satisfy a eighth relation $(x_0-x_a, i+v_x\Delta t_i,0+a_x(\Delta t_i,0)2/2)\alpha_a, i+(y_0-y_a, i+v_y\Delta t_i,0+$ $a_y(\Delta t_i,0)2/2)\beta a,i+(z_0-z_a, i+v_z\Delta t_i,0+a_z(\Delta t_i,0)2/2)\chi_a, i=0 \; (i=8);$ represents a ninth probe signal plane by a collection of three-dimensional Cartesian coordinates (x, y, z) that satisfy a ninth relation $(x_0-x_a, i+v_x\Delta t_i,0+a_x(\Delta t_i,0)2/2)\alpha_a, i+(y_0-y_a, i+v_y\Delta t_i,0+a_y(\Delta t_i,0)2/2)\beta a,i+(z_0-z_a, i+v_z\Delta$ $t_i,0+a_z(\Delta t_i,0)2/2)\chi_a, i=0 \; (i=9);$ where ($x_a$, i, $y_a$,i, $z_a$, i) are the location coordinates of said aircraft at a time said probe signal plane parameters are determined, $\alpha_a$,i, $\beta a$,i and $\chi_a$,i are direction cosines representing said probe signal plane, for i=1, 2, 3, 4, 5, 6, 7, 8, 9, and $\Delta t_i$, $0=t_i-t_0$;

obtaining a simultaneous solution ($x'_0$, $y'_0$, $z'_0$, $v'_x$, $v'_y$, $v'_z$) for the location coordinates and velocity coordinates that simulataneously satisfy the first, second, third, fourth, fifth, sixth, seventh, eighth and ninth relations; and interpreting the location coordinates $x'(t)=x'_0+v'_x(t-t0)+a'_x(t-t_0)2/2,$ $y'(t)=y'_0+v'_y(t-t0)+a'_y(t-t_0)2/2,$ $z'(t)=z'_0+v'_z(t-t0)+a'_z(t-t_0)2/2,$ as three-dimensional location coordinates for said probe signal source for at least one time t.

\* \* \* \* \*